United States Patent

[11] 3,625,832

[72] Inventors: Claude Gatellier
  Boulogne;
  Georges Glikmans, Meudon la Foret, both of France
[21] Appl. No.: 821,985
[22] Filed: May 5, 1969
[45] Patented: Dec. 7, 1971
[73] Assignee: Institut Francais du Petrole, des Carburants Et Lubrifiant (Hts de Seine), France
[32] Priority: May 10, 1968
[33] France
[31] 151500

[54] PROCESS FOR SEPARATING MICRO ORGANISMS FROM A FERMENTATION WORT
10 Claims, No Drawings

[52] U.S. Cl................................................... 195/82, 195/28 R
[51] Int. Cl.................................................... C12b 1/26
[50] Field of Search........................................ 195/3 H, 3, 28, 82

[56] References Cited
UNITED STATES PATENTS
3,530,039  9/1970  Bernheimer et al. .........  195/96

Primary Examiner—A. Louis Monacell
Assistant Examiner—Seymour Rand
Attorney—Millen, Raptes & White

ABSTRACT: Yeast fermentation worts containing hydrocarbon, water, and inorganic salts, are resolved by contacting the worts with a mixed solvent system containing a dialkyl-ketone having at least four carbon atoms, e.g., methyl-ethyl-ketone, and another solvent selected from acetone, ethanol, n-propanol, iso-propanol and tert-butanol. As a result, three phases are formed, one of which is a heavy aqueous phase containing purified yeast which is then separated from the two other phases.

PROCESS FOR SEPARATING MICRO-ORGANISMS FROM A FERMENTATION WORT

This invention relates to a new process for separating micro-organisms and more particularly yeasts from a fermentation wort; this process provides for recovery of the micro-organisms, particularly those produced in an aerated culture in media containing, in addition to the micro-organisms, one or more hydrocarbons, for example a hydrocarbon cut, and a nutritive aqueous medium comprising inorganic salts as well as organic substances, for example vitamins, which are necessary to the growth of micro-organisms.

It is well known that the culture medium recovered from a fermentation vessel, i.e., that vessel in which the culture takes place, consists of a more or less thick emulsion which contains the micro-organisms, for example yeasts, unconverted hydrocarbons (in the form of a free hydrocarbon phase or only of the portion adsorbed by the walls of the cells) and a substantial amount of aqueous inorganic medium. A conventional centrifugation is usually unable to completely separate the yeasts from a substantial amount of hydrocarbons.

In order to purify the yeasts which thus have been obtained by centrifugation, several treatments have been proposed, such as a plurality of washings with water containing a surface active agent, usually followed with a washing with pure water, each washing being followed with a centrifugation.

Even after repeated washings, the yeasts remain insufficiently purified.

Another treatment consists of contacting the so-purified and centrifugated yeasts with such solvents as saturated light hydrocarbons, for example hexane, aromatic hydrocarbons, for example benzene, ethers, alcohols, for example iso-propanol or ethanol, or mixtures of the same.

Although these repeated washings and centrifugations are costly and time consuming, the purification of the yeasts is not completely satisfactory.

According to this invention, an efficient separation and purification of the yeasts may be obtained by contacting the starting emulsion (comprising micro-organisms, water and hydrocarbons) with:

a. at least one dialkyl-ketone having at least four carbon atoms per molecule, for example methyl-ethyl-ketone, diethyl-ketone, methyl-isobutyl-ketone or propyl-ethyl-ketone, and b. at least one solvent selected from acetone, ethanol, propanol, iso-propanol and tert-butanol.

Any type of contacting vessel may be used, provided an efficient stirring is obtained. Then the stirring is discontinued and 3 phases appear: a heavy aqueous phase containing the micro-organisms, for example yeasts, an intermediate phase containing water and the solvent of group (b), and a lighter phase which is rich in solvent of group (a) and residual hydrocarbons.

The effluent from the fermentation vessel is preferably introduced at first into a quiet zone in order to obtain a first separation in two phases, one consisting of the so-called emulsion containing the residual hydrocarbons, the yeasts and a portion of the aqueous inorganic medium, the other mainly consisting of the aqueous inorganic medium.

If a large amount of hydrocarbons remains unconverted at the end of the culture (for example when as substrate is used a gas oil containing a minor amount of straight-chain paraffins), three phases may appear: a hydrocarbon phase, an aqueous phase and the emulsion phase containing water and a large amount of residual hydrocarbons.

Although the aqueous phase may be recycled to the fermentation vessel, the emulsion is collected in order to be subjected to the treatment of this invention.

It must be pointed out that this separation in three phases is obtained only with the above mixture of solvents. Thus when there is used for example a mixture containing no solvent of the group (a), for instance a mixture of acetone and iso-propanol, the formation of three separate phases does not occur.

The temperature at which the mixture of solvents is contacted with the emulsion is preferably between 20° and 45° C., and more preferably at about 30° C. The pH of the emulsion is preferably adjusted at a value between 2 and 8 by any appropriate means.

In this process the yeasts may be separated from the fermentation wort without use of centrifugations whereby the cost of the process is substantially reduced. At the same time the micro-organisms are washed by the solvents so as to make them free or substantially free from hydrocarbons and organic byproducts resulting from the fermentation, for example fatty acids, fatty alcohols or esters.

It is thus easy to recover, for example by mere decantation and withdrawal, the heavy phase of yeasts from the three phases obtained by this process.

The two other phases may also be easily separated, and, after removal, for example by distillation, of the residual hydrocarbons of the lightest phase and water of the intermediary phase, the solvents of groups (a) and (b) may be easily reused in a new separation and purification step.

This treatment may be carried out in several manners. For example, the emulsion may be contacted with the solvent of group (a) and then with that of group (b), or otherwise the emulsion may be contacted with the preformed mixture of (a)+(b).

If desired, the paste of yeasts obtained by decantation according to this invention may be thereafter contacted with a solvent or a mixture of solvents such as those used by the prior art.

The yeast concentrate will be preferably contacted with a mixture of solvents which is identical to that used for separating the yeasts from the fermentation medium.

It will be mentioned that the separation process of this invention may be applied not only to the emulsions containing hydrocarbons and yeasts, but also to the emulsions containing other micro-organisms such as molds or bacteria. Thus any disclosure relating to "yeasts" may also be applied to molds or bacteria.

It is also possible to add a small amount of additional solvent, for example a chlorinated hydrocarbon, to the mixture of solvents (a) and (b).

The total amount of solvents (a) and (b) to be contacted with the emulsion from the yeasts cultivation zone, and more particularly the ratio of the solvents (a) and (b) are dependent on the amounts of aqueous and hydrocarbon phases of this emulsion.

It is preferred to use a small excess of solvent of type (a) with respect to the solvent of type (b); for example the ratio by weight of the solvent of type (a) to the solvent of type (b) will be between 1 and 8 and more particularly between 1.5 and 5, although these values are not considered as limitative.

As a rule, there will be used from 1 to 10 and preferably from 2 to 5 volumes of mixture of the solvents (a) and (b) per volume of emulsion containing the micro-organisms.

This process may be carried out batchwise or continuously. It is of particularly high interest when the micro-organisms and more particularly the yeasts have been cultivated on a hydrocarbon substrate containing a relatively low amount of straight-chain paraffins, for example 5 to 69 percent by weight.

It is well known that the growth of yeasts is dependent on the normal paraffins content of the feed charge.

This process will thus be advantageously used for treating an emulsion from a fermentation vessel which had been fed, for example, with a paraffinic gasoil (containing about 10 percent of normal paraffins).

The conditions under which the micro-organisms may grow are well known. For growing yeasts, the temperature is preferably between 20° and 40° C., the pH preferably between 3 and 5 and a good contact must be realized between oxygen, the yeasts and the hydrocarbon and aqueous phases.

The aqueous medium usually contains nitrogen- and phosphorus-containing compounds, for example $(NH_4)_3PO_4$, growth factors (compounds of the vitamin B type), oligo-elements and essential ions such as $K^+$, $Mg^{++}$ and $SO_4^{--}$. The essential ions are dependent on the particular type of cultivated micro-organisms.

Examples 1 to 4 are given for illustrating the process of this invention; examples 1A and 4A are given for comparison purposes but form no part of this invention.

EXAMPLE 1

Yeasts of the *Candida lipolytica* type are continuously grown in a fermentation vessel, in the presence of a carbon source consisting of a gasoil containing 11 percent of linear paraffinic hydrocarbons and in the additional presence of an aqueous nutritive phase, the composition of which is given hereafter.

Air is injected in a divided form from the bottom of the vessel. The pH is maintained at about 4 and the temperature at about 27° C.

The aqueous nutritive medium has the following composition:

| | |
|---|---|
| di-ammonium phosphate | 2.2 g. |
| potassium chloride | 1.1 g. |
| magnesium sulfate | 0.9 g. |
| tap water (containing oligo-elements) | 320 g. |
| yeast extract (growth factor) | 0.03 g. |
| distilled water | 1,000 g. |

The liquid effluent from the fermentation vessel is passed into a decantation vessel in which a first separation takes place between an aqueous phase, half of which is recycled to the fermentation vessel, a phase of unconverted gasoil and an emulsion or paste of yeasts consisting essentially of water (with inorganic salts), in a proportion of about 90 percent by weight, and of 5 percent of yeasts and 5 percent of residual hydrocarbons.

One volume of this paste is contacted with 2 volumes of a liquid mixture consisting of 4 parts by volume of methyl-ethyl-ketone and one part by volume of acetone (the ratio by weight is also about 4/1).

Three phases separate: a lower aqueous phase of yeasts, an intermediary phase essentially comprising acetone and water and a lighter phase mainly comprising methyl-ethyl-ketone and residual hydrocarbons.

The aqueous phase is withdrawn; the yeasts contained therein are free of residual hydrocarbons and of byproducts of the fatty acid type. They may be dried and stored for a long-time without turning rancid.

The two other phases are distilled, and the thus recovered acetone and methyl-ethyl-ketone may be used anew.

EXAMPLE 1 A

Example 1 is repeated, except that the paste of yeasts is contacted with 2 volumes of a mixture comprising 1 part of acetone and 4 parts of iso-propanol.

The total volume of the emulsion increases but no separation of phases occurs as in example 1.

It is necessary to centrifugate the emulsion. Further the so-obtained yeasts still contain 1.2 percent of residual hydrocarbons.

The same operation has been repeated, without improved result, by changing the amounts of acetone and iso-propanol.

EXAMPLES 2 AND 3

Example 1 is repeated with the following changes:
There is used a mixture of methyl-isobutyl-ketone and ethanol (example 2) and a mixture of methyl-ethyl-ketone and propanol (example 3).

All other conditions remaining unchanged, particularly the amounts of solvents, there is obtained a separation of the emulsion in three phases from which yeasts substantially free from hydrocarbons and byproducts may be obtained.

EXAMPLE 4

Example 1 is repeated with the following change: the hydrocarbon feed charge for the culture step has been obtained by dewaxing a lube oil. This charge contains 90 percent of straight-chain paraffins. The aqueous nutritive medium remains unchanged.

By decantation of the effluent from the fermentation vessel, there is obtained an emulsion consisting of 90 percent by weight of water, 9.5 percent of yeasts and 0.5 percent of residual hydrocarbons.

One volume of this emulsion is contacted with 5 volumes of a mixture consisting of 1.5 parts by weight of methyl-ethyl-ketone per part by weight of acetone.

As in example 1, three phases appear. The yeasts are removed from the heavy phase; they are substantially free from residual hydrocarbons and byproducts.

EXAMPLE 4 A

Example 4 is repeated except that the mixture of methyl-ethyl-ketone and acetone is replaced by the same volume of a mixture of hexane with ethanol.

The ratio by weight of hexane to ethanol is 1.5, corresponding to a ratio by volume of hexane to ethanol of 65/35.

Under these conditions, no separation in three phases occurs, but only an increase of the total volume of the emulsion. As in example 1 A it is necessary to centrifugate in order to recover yeasts containing 0.2 percent of residual hydrocarbons.

What we claim as this invention is:

1. A process for separating and purifying micro-organisms and more particularly yeasts from a fermentation wort also containing at least one hydrocarbon and water together with inorganic salts, comprising contacting this wort with (a) at least one dialkyl-ketone having at least four carbon atoms per molecule and (b) at least one solvent selected from the group consisting of acetone, ethanol, n-propanol, iso-propanol and tert-butanol, said contacting resulting in the formation of three phases, one of which is a heavy aqueous phase containing purified yeasts, and separating the latter from the two other phases.

2. A process according to claim 1, wherein the wort is subjected to a prior decantation step so as to separate at least one aqueous phase from at least one emulsion of yeasts, the latter being contacted with the solvents (a) and (b).

3. A process according to claim 1, wherein the wort is contacted with a preformed mixture of the solvents (a) and (b).

4. A process according to claim 1, wherein the dialkyl-ketone is methyl-ethyl-ketone, methyl-isobutyl-ketone, diethyl-ketone or propyl-ethyl-ketone.

5. A process according to claim 1, wherein from 1 to 10 volumes of the mixture of solvents (a) and (b) are used per volume of wort.

6. A process according to claim 1, wherein the ratio by weight of the solvent (a) to the solvent (b) is between 1 and 8 at the time of contact.

7. A process according to claim 5, wherein from 2 to 5 volumes of the mixture of solvents (a) and (b) are used per volume of wort.

8. A process according to claim 6, wherein the ratio by weight of the solvent (a) to the solvent (b) is between 1.5 and 5 at the time of contact.

9. A process according to claim 1, wherein the solvent (a) is methyl-ethyl-ketone and the solvent (b) is acetone.

10. A process according to claim 1, wherein the wort is simultaneously contacted with a chlorinated hydrocarbon.

* * * * *